US009043104B2

(12) United States Patent
Kiefer et al.

(10) Patent No.: US 9,043,104 B2
(45) Date of Patent: May 26, 2015

(54) METHOD FOR DETERMINING AND SELECTING THE OPTIMAL GEAR BEFORE DRIVING INTO A CURVE FOR A MOTOR VEHICLE HAVING AN AUTOMATIC TRANSMISSION

(75) Inventors: Michael Kiefer, Tettnang-Walchesreute (DE); Franz-Josef Schuler, Kressbronn (DE); Uwe Reitemeier, Meckenbeuren (DE); Andreas Maus, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 214 days.

(21) Appl. No.: 13/577,283

(22) PCT Filed: Dec. 14, 2010

(86) PCT No.: PCT/EP2010/069612
§ 371 (c)(1),
(2), (4) Date: Aug. 6, 2012

(87) PCT Pub. No.: WO2011/098174
PCT Pub. Date: Aug. 18, 2011

(65) Prior Publication Data
US 2012/0310499 A1 Dec. 6, 2012

(30) Foreign Application Priority Data
Feb. 12, 2010 (DE) .......................... 10 2010 001 873

(51) Int. Cl.
*F16H 61/02* (2006.01)
*F16H 59/66* (2006.01)
(Continued)

(52) U.S. Cl.
CPC ............ *F16H 61/0213* (2013.01); *F16H 59/66* (2013.01); *F16H 61/21* (2013.01); *F16H 2059/003* (2013.01); *F16H 2059/666* (2013.01)

(58) Field of Classification Search
CPC ..... F16H 61/0213; F16H 59/44; F16H 59/66; F16H 61/21; F16H 2059/003; F16H 2059/666; B60W 2550/142; B60W 10/06

USPC .......... 701/65, 36, 41, 42, 43, 44, 48, 70, 72, 701/124; 180/9, 9.38, 9.44, 12, 19.2, 23, 180/65.27, 65.28, 65.285, 211, 222, 223, 180/234, 402–426, 38, 280, 427, 428, 429; 340/988–996; 477/2, 3, 7
See application file for complete search history.

(56) References Cited

U.S. PATENT DOCUMENTS 4,584,906 A * 4/1986 Nagaoka et al. ............... 477/120
4,679,145 A * 7/1987 Beeck et al. .................... 701/51
(Continued)

FOREIGN PATENT DOCUMENTS

DE 42 01 142 A1 8/1992
DE 100 30 050 A1 2/2001
(Continued)

OTHER PUBLICATIONS

German Search Report.
(Continued)

*Primary Examiner* — James Trammell
*Assistant Examiner* — James E Stroud
(74) *Attorney, Agent, or Firm* — Davis & Bujold, P.L.L.C.; Michael J. Bujold

(57) ABSTRACT

A method of determining and shifting to an optimal gear in a vehicle prior to entering a curve in a vehicle which comprises an automatic transmission. A curve speed limit is determined for an anticipated curve which is recognized by a navigation device, an anticipated road pattern and dependent on the vehicle and curve or road data, and a sportiness indicator (Ftyp). For each anticipated curve, an actual, optimal gear is determined, based on the determined curve speed limit and the sportiness indicator (FTyp) and, after determining the optimal gear, the method performs a check to determine whether or not the optimal gear deviates from the engaged gear (RGA_DEST). When a deviation is recognized and a driver reaction, which causes a deceleration of the vehicle and/or a reduction of the vehicle speed, is present, a down shift down to the actual, optimal gear occurs.

18 Claims, 1 Drawing Sheet

(51) Int. Cl.
*F16H 61/21* (2006.01)
*F16H 59/00* (2006.01)

(56) References Cited

U.S. PATENT DOCUMENTS

| | | | | |
|---|---|---|---|---|
| 5,351,776 | A * | 10/1994 | Keller et al. | 701/70 |
| 5,428,531 | A * | 6/1995 | Hayafune | 701/65 |
| 5,646,849 | A * | 7/1997 | Walenty et al. | 701/70 |
| 5,671,143 | A * | 9/1997 | Graber | 701/72 |
| 5,957,552 | A * | 9/1999 | Claussen et al. | 303/192 |
| 5,991,669 | A * | 11/1999 | Dominke et al. | 701/1 |
| 6,070,118 | A * | 5/2000 | Ohta et al. | 701/65 |
| 6,188,316 | B1 * | 2/2001 | Matsuno et al. | 340/441 |
| 6,205,375 | B1 * | 3/2001 | Naito | 701/1 |
| 6,259,994 | B1 * | 7/2001 | Henneken et al. | 702/33 |
| 6,278,930 | B1 * | 8/2001 | Yamada et al. | 701/82 |
| 6,392,535 | B1 * | 5/2002 | Matsuno et al. | 340/441 |
| 6,416,141 | B1 * | 7/2002 | Zinnkann et al. | 303/191 |
| 6,529,813 | B1 * | 3/2003 | Mauz et al. | 701/56 |
| 6,572,202 | B2 * | 6/2003 | Watanabe | 303/167 |
| 6,626,797 | B2 | 9/2003 | Shiiba et al. | |
| 6,654,674 | B2 * | 11/2003 | Lu et al. | 701/36 |
| 7,134,985 | B2 * | 11/2006 | Watanabe et al. | 477/186 |
| 7,319,927 | B1 * | 1/2008 | Sun et al. | 701/93 |
| 8,694,208 | B2 * | 4/2014 | Yokota | 701/41 |
| 2008/0033621 | A1 * | 2/2008 | Nakamura et al. | 701/65 |
| 2008/0125946 | A1 * | 5/2008 | Fakler et al. | 701/62 |
| 2008/0305926 | A1 * | 12/2008 | Asaoka | 477/44 |
| 2009/0030574 | A1 * | 1/2009 | Yamakado et al. | 701/44 |
| 2009/0299630 | A1 * | 12/2009 | Denaro | 701/300 |
| 2010/0100293 | A1 | 4/2010 | Takanami | |
| 2011/0126533 | A1 * | 6/2011 | Noll et al. | 60/431 |

FOREIGN PATENT DOCUMENTS

| | | |
|---|---|---|
| DE | 10 2005 055 744 A1 | 5/2007 |
| DE | 10 2006 030 528 A1 | 1/2008 |
| DE | 601 32 743 T2 | 3/2009 |
| DE | 11 2008 000 582 T5 | 1/2010 |
| EP | 0 831 255 A1 | 3/1998 |
| EP | 0 897 496 B1 | 12/1999 |
| EP | 1 750 038 A2 | 2/2007 |

OTHER PUBLICATIONS

International Search Report (Form PCT/ISA/210).
Written Opinion (Form PCT/ISA/237).

* cited by examiner

METHOD FOR DETERMINING AND SELECTING THE OPTIMAL GEAR BEFORE DRIVING INTO A CURVE FOR A MOTOR VEHICLE HAVING AN AUTOMATIC TRANSMISSION

This application is a National Stage completion of PCT/EP2010/069612 filed Dec. 14, 2010, which claims priority from German patent application serial no. 10 2010 001 873.2 filed Feb. 12, 2010

FIELD OF THE INVENTION

The present invention concerns a method, for a motor vehicle comprising of an automatic transmission, for determining and shifting to an optimal gear before entering a curve, in accordance with the generic term of patent claim 1.

BACKGROUND OF THE INVENTION

The R&D in the automobile market always requires a more efficient use of resources with regard to consumption and polluting emissions, whereby these requirements apply to sub-assemblies of a vehicle, such as automatic transmissions. For that reason, modern automatic transmissions are realizing more and more gears; due to the numerous gears, the combustion engine can be operated in an advantageous manner more often at the optimal operating point, which hereby requires the respective optimizing of the shift strategy for the selection of gears in the transmission. With regard to the consumption, it is hereby important to provide the most efficient gear for each respective driving situation.

Based on the DE 10 2006 030 528 A1, the applicant is aware of a method for determination of anticipated gear ratio changes in electronically controlled motor vehicles. In that known method, environmental data, driver/vehicle data, and a first gear proposal are fed into a correction module through which the first proposal for a gear is matched, whereby the correction module has at least a drive situation module through which a current or an upcoming drive situation can be recognized. In addition, the correction module comprises of a determination module to which information of the acknowledged drive situation can be passed, and by which a second proposal for a gear ratio can be determined.

The known method also provides, in its framework, that in the determination module, depending of at least one recognized upcoming drive situation and driver/vehicle data, a first step checks whether at least one shift situation is present to intervene whereby, when at least one shift situation is present, a second step checks whether the conditions for execution of the respective intervention, for one of the recognized shift situations, is met.

If a shift situation has occurred and the conditions for the execution of an intervention are met, in a third step, the first gear proposal is matched and a second matched gear proposal is created which is passed to the transmission.

It is also provided, in the known method, that a multiple downshift through several gear steps can occur whereby an optional sportiness level can be determined, relevant for the allowed transmission ratio step and described gear number function, and through computation of vehicle data and/or through predetermination of the transmission control and/or through modifications of the vehicle adjustments for the driver. The identification of maximal possible curve speeds is not provided.

The sportiness level can hereby be determined in accordance with EP 897496 B1 of the applicant, for instance.

Within the framework of this disclosed method for determination of a curve drive with an automatic transmission of a vehicle, by means of an electronic transmission control device with a computation unit, a microcontroller, a storage device, and a control unit to trigger a hydraulic transmission control device, based on a measuring device at the wheels of the vehicle which measures the wheel rotational speed, a first processing function determines, in a computation unit, a transversal acceleration of the vehicle whereby in an additional processing function, of a driver-type nominal value, is determined based on the vehicle transversal acceleration and a vehicle speed.

Also, in an additional step, a shift pattern diagram is determined through an increment between the driver-type nominal value and a driver-type, based on several assigned driver-type or curve driving style shift patterns. In addition, in a differentiating function, it is evaluated whether the increment is equal to a 0 value whereby, based on the results of this evaluation, a counter value is adjusted, the counter values are divided into counter value ranges and, if there is an increasing number of the counter value range, the sportiness is assumed larger.

Known from DE 4201142 C2 is a drive speed limitation device for a vehicle with a vehicle supported navigation device, which continuously determines the position of the motor and which is compared with a roadmap comprising of a device with default settings for location dependent nominal speed values, while the motor vehicle approaches a curve on a road, and it has a drive speed sensor to issue a nominal speed value.

In addition, the known drive speed limitation device comprises a control unit which activates a warning device in case of exceeding the locally dependent and determined nominal speed values through the actual speed value and/or initiates a reduction of the drive speed to the nominal speed value; it is also provided that, when the navigation device recognizes that the location of the motor vehicle is close to this curve, the navigation device provides information about the curve to the steering direction, whereby the information about the curve includes at least the curvature radius and whereby the control device, due to the information which has been delivered by the navigation device, calculates a speed limit at which the motor vehicle can safely drive through this curve, and it determines a nominal speed value.

Hereby, the vehicle is decelerated by the drive speed limiting device, in case the drive speed is greater than the speed limit; the deceleration can also occur through closing of the thrust valve of the vehicle, meaning an intervention at the engine.

As a disadvantage, the present gear is hereby maintained which can cause that the engaged gear, after an initiated drive speed limitation, cannot be used any longer to accelerate the vehicle in accordance with the desire of the driver; in addition, the drive behavior of the driver, with regard to sportiness, is not observed which can impair the drive comfort.

EP 0 831 255 B1 also presents a vehicle control device comprising a device to maintain the road information, a current positioned sensor device to detect a common position on the road, an automatic transmission, a device to calculate a steering parameter in the automatic transmission, based on the reaction with regard to the detected current position and the obtained road information.

In addition, the known vehicle control device comprises of a speed reduction sensor device to detect a speed reduction operation of the driver, and an execution device to execute the calculated steering parameter, if a speed reduction operation of the driver is detected by the speed reduction sensor device, whereby the steering parameter calculation device comprises of a forward projection sensor device for detection of a specific position of the parts like in reaction to the detected, current position and the obtained road information, a distance calculation unit to calculate the distance from a current position to a specific position, a speed reduction conclusion device to conclude the need of a speed reduction, depending on a calculated distance before a current position to a specific position, and a selection device for a selective determination of the steering parameter, when the speed reduction conclusion device concludes the need for a speed reduction.

Hereby, the steering parameter can be a transmission ratio range of the automatic transmission or an upper and/or lower limiting value of transmission ratios of the automatic transmission; the specific position of a curve or road crossing can be the entering.

Within the framework of EP 0 831 255 B1, the drive behavior of the driver is not calculated and, for that reason, not observed with regard to the sportiness, which can limit the drive comfort from the driver's point of view.

SUMMARY OF THE INVENTION

The present invention has the task to propose a method, in a motor vehicle comprising an automatic transmission, for the determination and shifting to an optimal gear before entering into a curve through which the execution of the optimal gear can be selected in anticipation and in accordance with the drive style.

This task is solved through the characteristics of the patent claim 1. Additional invented embodiments and advantages are part of the dependent claims.

Thus, a method, in a motor vehicle comprising an automatic transmission, for determining and shifting to the optimal gear, before entering a curve, where the framework determines a curve speed limit for a curve by a navigation device by means of a digital map with the projected road pattern and recognized curve dependent of vehicle data, curve or road data, respectively, as well as a sportiness counter value whereby, based on a determined curve speed limit and the sportiness counter value, the actual, optimal gear for the projected curve is determined.

The determination of the curve speed limit and the optimal gear can, for instance, occur based on at least one parameter table which is stored in the transmission control device.

In accordance with an especially advantageous embodiment of the invention, if there is a deviation between the engaged gear and the actual, optimal gear, a simple down shift to the optimal gear is executed whereby, in case of the down shift into the actual, optimal gear requires a down shift of several gear steps, the shift down is executed in steps whereby the down shift occurs after the determination of the actual, optimal gear when a driver reaction is present, which causes a deceleration of the vehicle and/or a reduction of the vehicle speed, before the anticipated curve. The action of the driver, which causes a deceleration of the vehicle can, for instance, be activation of the brake or the presence of a brake pressure which exceeds a predetermined threshold.

In accordance with an especially advantageous embodiment of the invention, an adjustable timer is started simultaneously with initiation of the down shift, and an additional shift on is not possible until its expiration. When the timer expires, the actual, optimal gear is newly calculated and newly tested whether a driver reaction, which caused a deceleration and/or a reduction of the speed of the vehicle, is present whereby, if it is the case and the engaged gear deviates from the be calculated actual, optimal gear, then an additional, simple down shift is executed whereby a timer is simultaneously started and an additional down shift is not possible until its expiration.

The steps of this method are repeated as long until the actual, optimal gear does not deviate from the engaged gear or until no reaction from the driver, which can cause a deceleration of the vehicle and/or no reduction of the speed of the vehicle, is present.

During the down shift and, in the case that a down shift into the actual, optimal gear requires a down shift by several gear steps, it is guaranteed that the actual, optimal gear corresponds to the drive manner which is desired by the driver. For instance, based on the first calculated, optimal gear, a down shift from the seventh to the fifth forward gear might be necessary, whereby after the first down shift to the sixth gear, the driver does not activate the brake anymore or the speed of the vehicle is not further reduced and the newly calculated actual, optimal gear matches the engaged gear, and an additional down shift is no longer required. To the contrary, an additional down shift would no longer correspond with the drive manner which is desired by the driver.

The determination of the sportiness counter value occurs in accordance with the state of the art and in a way which is based on a calculation of the drive manner of the driver and the hereby respective parameters like, for instance, the rotational speed of the motor, the speed and/or the gear selection and a curve drive, preferably and in accordance with the EP 897 496 B1 provided by the applicant which is fully considered as part of this description.

Through the invented concept, a method is presented for determining and shifting of the optimal gear in a motor vehicle, before entering a curve, comprising an automatic transmission where, through the execution, the optimal gear is selected and shifted in anticipation and the drive manner or the desired drive manner, respectively.

BRIEF DESCRIPTION OF THE DRAWINGS

In the following, the invention is further explained based on the included drawings. It shows.

DETAILED DESCRIPTION OF THE PREFERRED EMBODIMENTS

Figure 1:
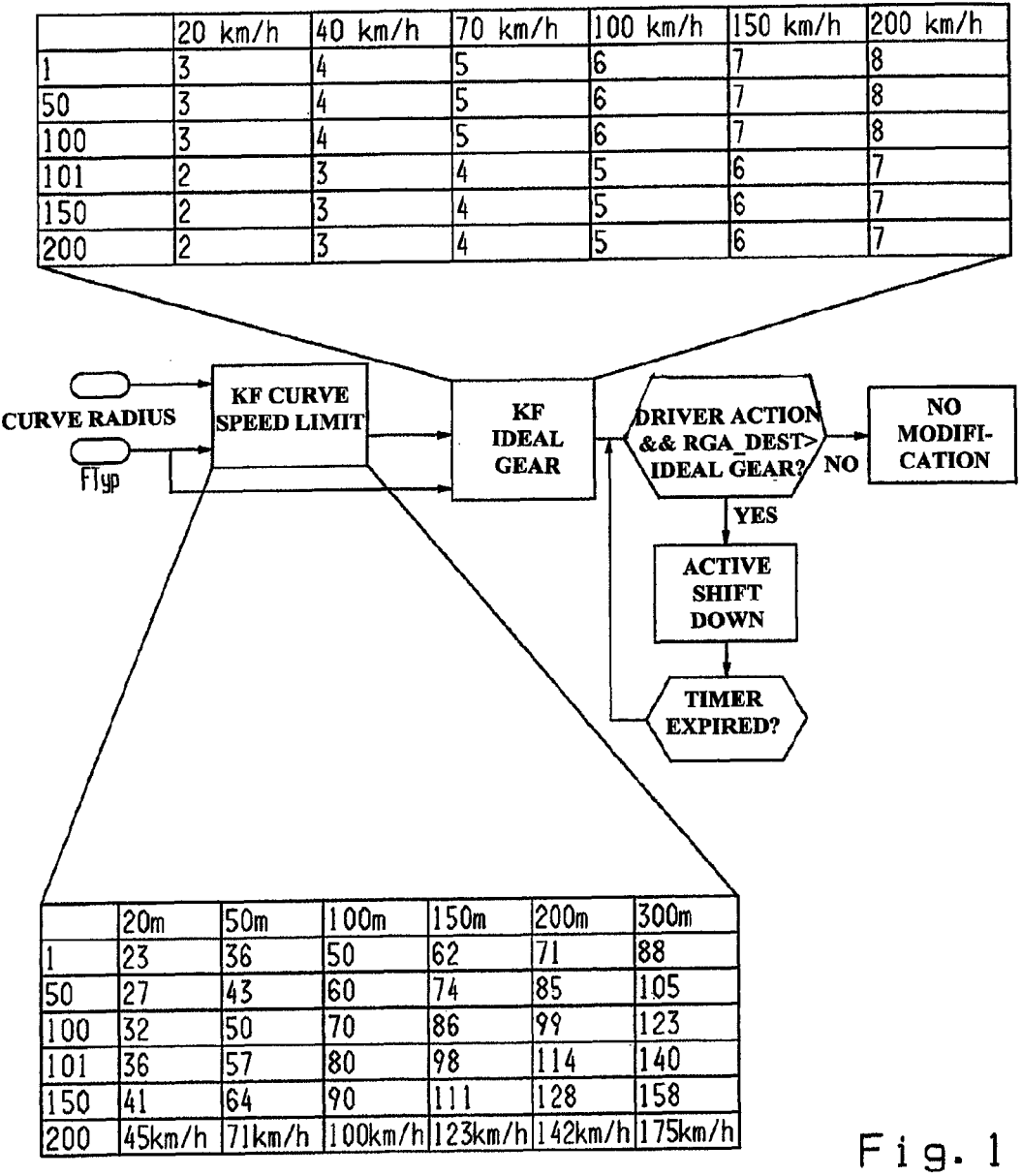
FIG. 1: a schematic timing diagram for explanation of the steps of the invented method, and FIG. 2 a diagram which visualizes the timing of the optimal gear which has to be engaged, in accordance with the invention, and the timing of the nominal gear, in accordance with a conventional drive strategy.

In accordance with the invention and with reference to FIG. 1, in a first step, an approaching curve is recognized via a navigation device which is part of the vehicle and by means of a digital map whereby, thereafter, based on vehicle data and curve or road data, respectively, an absolute speed limit for the curve is calculated, meaning at a certain curve radius, a certain curve slope and predetermined vehicle data, and the maximal possible speed without exceeding the gripping limit of the tires.

For instance, the absolute curve speed limit $v\_grenz$ can be calculated for a vehicle with a track gauge of 1.5 m end center of gravity, a height of 0.6 m and a maximal coefficient of adhesion $\mu_r=0.8$, a curve radius $r_k$, and a curve slope $\beta$ based on the formula $$v\_grenz = 11.28 \sqrt{\frac{\mu_r + \tan\beta)r_k}{1 - \mu_r \tan\beta}} \text{ km/h}$$

are computed.

It is preferably assumed that, in accordance with the invention, the curve slope β=0.

Based on the present method, the relevant curve speed limit is calculated based on the absolute curve speed limit depending on a sportiness counter value of the driver, whereby the curve speed limit also increases with an increasing sportiness counter value and vice versa; at a maximal sportiness counter value, the curve speed limit matches the absolute curve speed limit.

As it can be seen in FIG. 1, a first parameter field KF_curve_speed_limit can be created and stored in the transmission control unit, through which the relevant curve speed limit is calculated for the present method as a function of the supporting as counter value FTyp and the road data whereby, in that case, that the curve slope β has a value of 0, the curve speed limit for a predetermined track gauge, a predetermined center of gravity height and for a predetermined, maximal coefficient of adhesion is a function of the curve radius $r_k$, generated by the navigation device and the digital map, and of the sportiness counter value FTyp.

In the shown example, the sportiness counter value has values between 1 and 200, whereby a 200 value represents the maximum value so that, for instance, at a curve radius of 100 m, the curve speed limit would be 100 km/h at a maximum value for the sportiness counter value FTyp; in comparison to the same curve radius and the minimal value for the sportiness counter value FTyp, the respective curve speed limit would be significantly lower at a value of 50 km/h. Hereby and in accordance with the invented method, certain curve speed limits are matched with the driving manner of the driver.

In addition, a second parameter field KF_ideal_gear can be created and stored in the transmission control device, through which its actual, optimal gear is determined as a function of the relevant curve speed limit which is present for this method, which can be determined from the parameter field KF_curve_speed_µlimit, and is determined through the sportiness counter value FTyp.

It is hereby provided that a large value for the sportiness counter value FTyp corresponds to a lower gear, and that a low value for the sportiness counter value FTyp corresponds to a high gear. For instance, for a maximal value of the sportiness counter value FTyp, a possible lower gear is determined as an optimal gear, depending on the speed of the vehicle and the rotation speed of the engine; for the minimal value of the sportiness counter value FTyp, a possible high gear is determined as the optimal gear.

In FIG. 1 it is visualized that for a transmission with eight forward gears, for instance, in accordance with the invention, for a speed limit of 100 km/h and a sportiness counter value between 101 and 200, the fifth forward gear is the proposed actual, optimal gear which results in a sporty drive manner, but for a speed limit of 100 km/h and a sportiness counter value between 1 and 100 km/h, the sixth forward gear is the proposed actual, optimal gear.

After the determination of the actual, optimal gear, it is checked whether the actual, optimal gear deviates from the engaged gear RGA_DEST, whereby at the time when a deviation is recognized and a driver reaction is present, which causes a deceleration of the vehicle and/or a reduction of the speed of the vehicle, a down shift takes place.

In accordance with the invention, with the initiation of the down shift, an adjustable timer is simultaneously started and no further downshift is possible until this timer has expired. Once the timer has expired, the actual, optimal gear is newly calculated and the previous step is again executed until the actual, optimal gear does not deviate from the engaged gear RGA_DEST or until no driver reaction, which causes a deceleration of the vehicle and/or a reduction of the speed of the vehicle, is present.

In the case that a down shift to the actual, optimal gear requires a shift of several gear steps, the shift is performed in steps and is analogous to the described way of operation.

It can also be provided, in accordance with the invention, that a down shift takes place at the time when the distance of the vehicle is within an applicable range of the anticipated curve.

It is guaranteed, through the inventive method, that the optimum gear is selected and is engaged at a time prior to entering the curve which significantly improves the drive comfort. For the visualization of the differences compared to the conventional drive strategy, the FIG. 2 shows the time pattern of the optimal gear which has to be engaged, in accordance with the invention, and the nominal gear, in accordance with the conventional drive strategy and the brake pressure.

Figure 2:
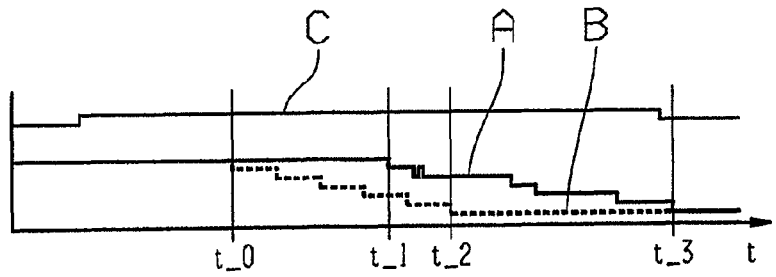

As one can see from the examples in FIG. 2 and the drawn patterns, a step shape down shift is executed in six gear steps, beginning at the time interval t_0, in time prior to the anticipated curve whereby the optimal gear is already engaged at the time interval t_0; the respective pattern is displayed by curve B.

During a down shift in accordance with a conventional drive strategy, the shift starts at a later time interval t_1 whereby, at that time, the optimal gear is engaged at a later time interval t_3. The respective pattern is displayed by curve A whereby curve C represents the brake pressure pattern, as a function over the time t, which demonstrates that the brake is activated during the execution of the invented method.

REFERENCE CHARACTERS

FTyp Sportiness Counter value
RGA_DEST Engaged Gear
A Time pattern diagram in accordance with the nominal gear in accordance with a conventional drive strategy
B Time pattern diagram of the optimum gear to be engaged, in accordance with the invention
C Time pattern diagram of the brake pressure

The invention claimed is:

1. A method of determining and shifting to an optimal gear, prior to entering a curve, in a vehicle comprising an automatic transmission, the method comprising the steps of: determining, via at least one parameter table stored in a transmission control device, a sportiness counter value that represents an incremental measurement of a desired level of sportiness of the driver; determining, via the at least one parameter table stored in the transmission control device, a curve speed limit for an anticipated curve which is recognized, by a navigation device, by a digital map and an anticipated road pattern, dependent on vehicle data and curve or road data, respectively, as well as the sportiness counter value (FTyp), determining, via the at least one parameter table stored in the transmission control device, an actual, optimal gear for the anticipated curve based on the determined curve speed limit and the sportiness counter value (FTyp), after determining, via the transmission control device, the actual, optimal gear, checking if the actual, optimal gear deviates from an engaged gear (RGA_DEST) of the transmission, determining, via the transmission control device, if either (a) a driver reaction that causes a deceleration of the vehicle is present or (b) a reduction of a speed of the vehicle is present, and down shifting, via the transmission control device, from the engaged gear to the actual, optimal gear when both a gear deviation is recognized and one of: the driver reaction that causes a deceleration of the vehicle is present and the reduction of a speed of the vehicle is present.

2. The method for determining and shifting to the optimal gear prior to entering the curve according to claim 1, further comprising the step of, when the down shift to the actual, optimal gear requires a down shift of a plurality of gear steps, performing the down shift in plurality of sequential steps.

3. The method for determining and shifting to the optimal gear prior to entering the curve according to claim 1, further comprising the step of performing the down shift at a time when a distance of the vehicle, from the anticipated curve, is within an applicable range.

4. The method for determining and shifting to the optimal gear prior to entering the curve according to claim 1, further comprising the step of, upon initiation of the down shift down, simultaneously starting an adjustable timer and preventing an additional down shift down from occurring until the adjustable timer expires, and once the time of the adjustable timer expires, another optimal gear is again determined and checked to determine whether the actual, optimal gear deviates from the engaged gear (RGA_DEST) of the transmission and whether one of a driver action that causes at least one of deceleration of the vehicle, is present and a reduction of the speed of the vehicle, is present, and at the time when these conditions are present, executing an additional down shift and repeating the method until the actual, optimal gear does not deviate from the engaged gear (RGA_DEST) or when both the driver reaction that causes a deceleration of the vehicle is no longer present and the reduction of the speed of the vehicle is no longer present.

5. The method for determining and shifting to the optimal gear prior to entering the curve according to claim 1, further comprising the step of, when determining the curve speed limit, calculating an absolute curve speed limit (v_grenz), meaning a maximal possible speed without exceeding an adhesion limit of the tires for a determined curve radius, a determined curve slope and determined vehicle data;

calculating the curve speed limit from the absolute curve speed limit depending on the sportiness counter value (FTyp) of the driver, whereby the curve speed limit increases with an increase in the sportiness counter value (FTyp), and vice versa, and that the actual, optimal gear is determined as a function of the curve speed limit and the sportiness counter value (FTyp), whereby a large value for the sportiness counter value (FTyp) corresponds to a lower gear and a low value for the sportiness counter value (FTyp) corresponds to a high gear.

6. The method for determining and shifting to the optimal gear prior to entering the curve according to claim 1, further comprising the step of creating and storing a first parameter table (KF_curve_speed_limit) in the transmission control unit, by which the curve speed limit is calculated as a function of the sportiness counter value (FTyp) and the road parameters, whereby in the case that the curve slope ($\beta$) is a value of zero, the curve speed limit is a function of a predetermined track gauge, of a predetermined gravity center height, and of a predetermined, maximal coefficient of adhesion and the curve radius (rk), provided through the navigation device and the digital map, and the sportiness counter value (FTyp), and creating and storing a second parameter table (KF_ideal_gear), and the transmission control unit, through which the actual, optimal gear is determined as a function of the curve speed limit, which can be determined by the parameter table (KF_curve_speed_limit) and the sportiness counter value (FTyp).

7. The method for determining and shifting to the optimal gear prior to entering a curve according to claim 1, further comprising the step of determining the sportiness counter value (FTyp) based on a drive behavior of the driver and one of a rotational speed of the motor, a gear selection, and a curve drive.

8. The method for determining and shifting to the optimal gear prior to entering a curve according to claim 1, further comprising the step of using a maximum value, a minimum value, and at least one discrete value, between the maximum value and the minimum value, as a range of possible sportiness counter values (FTyp).

9. The method for determining and shifting to the optimal gear prior to entering a curve according to claim 1, further comprising the step of using a maximum value, a minimum value, and a plurality of discrete values, between the maximum value and the minimum value, as a range of possible sportiness counter values (FTyp).

10. The method for determining and shifting to the optimal gear prior to entering a curve according to claim 1, further comprising the step of using a maximum value, a minimum value, and at least four discrete values, between the maximum value and the minimum value, as a range of possible sportiness counter values (FTyp).

11. The method for determining and shifting to the optimal gear prior to entering a curve according to claim 1, further comprising the step of using discrete numerical values as the sportiness counter values (FTyp).

12. The method for determining and shifting to the optimal gear prior to entering a curve according to claim 1, further comprising the step of representing the sportiness counter values (FTyp) by a curve specific to a desired level of sportiness of the driver.

13. The method for determining and shifting to the optimal gear prior to entering a curve according to claim 1, further comprising the step of down shifting into the actual, optimal gear when both a gear deviation is recognized and the driver reaction that causes a deceleration of the vehicle is present.

14. The method for determining and shifting to the optimal gear prior to entering a curve according to claim 1, further comprising the step of selecting and engaging the actual, optimal gear before entering the curve.

15. The method for determining and shifting to the optimal gear prior to entering a curve according to claim 1, further comprising the step of down shifting into the actual, optimal gear only when both a gear deviation is recognized and the driver reaction that causes a deceleration of the vehicle is present.

16. The method for determining and shifting to the optimal gear prior to entering a curve according to claim 1, further comprising the step of down shifting into the actual, optimal gear only when both a gear deviation is recognized and the reduction of a speed of the vehicle is present.

17. The method for determining and shifting to the optimal gear prior to entering a curve according to claim 1, further comprising the step of down shifting into the actual, optimal gear only when each of:

a gear deviation is recognized, the driver reaction that causes a deceleration of the vehicle is present, and the reduction of a speed of the vehicle is present.

18. The method for determining and shifting to the optimal gear prior to entering a curve according to claim 1, further comprising the step of using, as the vehicle data, at least one of:

a center of gravity height, a track gauge, and a maximum coefficient of adhesion.

* * * * *